(12) United States Patent
Hatch

(10) Patent No.: US 12,428,981 B2
(45) Date of Patent: Sep. 30, 2025

(54) LUBE SKID

(71) Applicant: Heritage Industries, LLC, Salt Lake City, UT (US)

(72) Inventor: Marshall Hatch, West Valley, UT (US)

(73) Assignee: Heritage Industries, LLC, Salt Lake City, UT (US)

( * ) Notice: Subject to any disclaimer, the term of this patent is extended or adjusted under 35 U.S.C. 154(b) by 0 days.

(21) Appl. No.: 18/404,680

(22) Filed: Jan. 4, 2024

(65) Prior Publication Data

US 2024/0263575 A1 Aug. 8, 2024

Related U.S. Application Data

(63) Continuation of application No. 18/106,425, filed on Feb. 6, 2023, now Pat. No. 11,905,864.

(51) Int. Cl.
| | |
|---|---|
| *F01M 11/04* | (2006.01) |
| *B60S 5/00* | (2006.01) |
| *F16N 31/00* | (2006.01) |
| *F16N 37/00* | (2006.01) |

(52) U.S. Cl.
CPC ............... *F01M 11/04* (2013.01); *B60S 5/00* (2013.01); *F16N 31/004* (2013.01); *F16N 37/00* (2013.01); *F16N 2037/006* (2013.01)

(58) Field of Classification Search
CPC ............... F01M 11/04; F01M 11/0425; F01M 11/0458; B60S 5/00; F16N 31/004; F16N 37/00; F16N 2037/006; F16N 31/00; F16N 31/002
See application file for complete search history.

(56) References Cited

U.S. PATENT DOCUMENTS

| | | | | |
|---|---|---|---|---|
| 4,756,411 | A | * | 7/1988 | Garland ................. F16N 31/00 184/106 |
| 2016/0236657 | A1 | * | 8/2016 | Erwin .................... B67D 7/78 |

* cited by examiner

*Primary Examiner* — Jacob M Amick
(74) *Attorney, Agent, or Firm* — Foley & Lardner LLP

(57) ABSTRACT

A lube skid apparatus configured to be moveable and transportable. The lube skid having one or more tanks carried by a scaffold of the lube skid. One or both tanks having sloped bottom walls to optimize flow of fluids in the tanks to minimize residual fluid left in the tank. One or both tanks having sloped top walls configured to contain and direct the flow of fluid spills on the skid to an adjacent sump. The skid also carries a plurality of service devices such as a motor, an air compressor, a tank to hold compressed air, pumps to move fluid with associated filters and hoses, and one or more service storage drawers.

20 Claims, 10 Drawing Sheets

LUBE SKID

BACKGROUND OF THE INVENTION

This application is a continuation application of and claiming the benefits of priority to prior pending U.S. patent application Ser. No. 18/106,425 filed Feb. 6, 2023 which is a continuation of U.S. patent application Ser. No. 16/806,419 filed Mar. 2, 2020 now U.S. Pat. No. 11,598,231.

1. FIELD OF THE INVENTION

The disclosed technology relates to a lube skid. A lube skid is a readily portable and often detachable service assembly. A lube skid may comprise a number of components including one or more tanks, motors, pumps, hoses and reels, pneumatic couplers and hoses, a generator and/or an air compressor.

2. BACKGROUND AND RELATED ART

Various lube skids have been constructed to provide fluid, pneumatic and/or electric power function for the service, repair or maintenance of vehicles or machinery. Lube skids may include various fluid, pneumatic and/or electrical service devices or tools. Lube skids are designed to be moved from one location to another location by forklift or crane. For example, a lube skid can be moved on and off a service vehicle or from one service vehicle to another service vehicle. Known lube skids arrange service components in various configurations on the skid. Known examples include a portable fluid containment assembly disclosed in U.S. Pat. No. 7,856,998 issued Dec. 28, 2010, a service module for an automobile service vehicle disclosed in U.S. Pat. No. 5,349,980 issued Sep. 27, 1994, and multiple non-manifolded fuel tanks on a portable platform disclosed in U.S. Pat. No. 10,009,915 issued Oct. 16, 2018.

SUMMARY OF THE INVENTION

The disclosed technology presented in this patent is directed to a lube skid comprising a carrying scaffold to support a plurality of service components such as a fuel-combustion or electric motor, an air compressor, horizontally stacked tanks providing one or more new product tanks and one or more waste tanks, a grease barrel, corresponding hoses and hose reels, a bi-directional evacuation pump, a sump, spill containment surfaces and structures, storage drawers and an integrated infrastructure to support a plurality of lube skids components, and skid function controls positioned in secure support frame members.

In one embodiment the lube skid comprises tanks configured with flow optimizing surfaces to reduce the dead zone of the tanks in which a residual amount of fluid is consistently left in the bottom of a tank because the fluid cannot be effectively pumped from the tank. This residual amount of fluid reduces the capacity of fluid distribution and increases the weight of the skid during transport. The optimized surfaces minimize residual fluid in the tanks.

In one embodiment the lube skid is powered entirely by an electric motor thereby allowing full deployment of all lube skid functions independent of the engine of the service vehicle on which the lube skid is placed thereby providing an idle- and emission-free environment suitable for full operation of the lube skid in indoor or other enclosed-spaces.

In one embodiment the lube skid comprises tanks which provide spill containment surfaces and guide fluid spills to an adjacent sump for conveyance into a waste tank.

In one embodiment the lube skid comprises function controls integrated into the support frame of the lube skid thereby removing the necessity of having a large control box mounted on the lube skid.

In one embodiment the lube skid comprises storage drawers which are positioned for ease of use by an operator.

In one embodiment the lube skid comprises a component support frame which integrates support for one or more tanks and storage drawers, facilitates tank drainage to minimize residual fluid and provides forklift pockets for moving the skid from location to location.

These and other features and advantages of the disclosed technology will be set forth or will become more fully apparent in the description that follows and in the appended claims. The features and advantages may be realized and obtained by employing the disclosure of this patent and as particularly pointed out in the appended claims and their equivalents. Furthermore, the features and advantages of the disclosed technology may be learned by the practice of it or may be derived from the description set forth hereinafter without undue experimentation.

BRIEF DESCRIPTION OF THE DRAWINGS

In order that the manner in which the above referenced and other features and advantages of the disclosed technology are achieved, a more particular description of the invention will be rendered through reference to exemplary embodiments illustrated in the appended drawings. It will be appreciated by one of skill in the art that the following descriptions and drawings depict only exemplary embodiments of the disclosed technology and are not, therefore, to be considered as limiting in scope. Therefore, the disclosed technology is described and explained with additional specificity and detail through the use of the accompanying drawings in which.

DETAILED DESCRIPTION OF THE INVENTION

The disclosed technology relates generally to an improved lube skid carrying a combination of a plurality of lube service apparatuses. Lube service apparatuses may comprise a fuel-combustion or electric motor, an air compressor, horizontally stacked tanks providing one or more new product tanks and one or more waste tanks, a grease barrel, corresponding hoses and hose reels, a bi-directional evacuation pump, a sump, spill containment surfaces and structures, storage drawers and an integrated infrastructure to support a plurality of lube skids components, and skid function controls positioned in secure support frame members.

For purposes of this patent, the term "lube service component" shall mean a device such as a fuel-combustion or electric motor, an air compressor, horizontally stacked tanks providing one or more new product tanks and one or more waste tanks, a grease barrel, pumps for product or grease with corresponding hoses and hose reels, a bi-directional evacuation pump with corresponding hoses and hose reels, a sump, spill containment surfaces, or skid function controls.

A lube skid is intended to be a portable assembly which provides certain maintenance, service and/or repair functions for vehicles and equipment. The lube skid is carried by a transport vehicle to provide services to a vehicle or equipment in the field. The lube skid is configured such that it can be moved and placed as one collective unit, that is, the lube skid may be readily moved from one location to another location. For example, when not in the use the lube skid may be placed in a storage location. When the service functions of the lube skid are needed, the lube skid may be retrieved from storage, lifted and placed in or on a transport vehicle. Or, as needed or desired, the lube skid may be transferred from one transport vehicle to another transport vehicle. As a result, the lube skid does not require a dedicated transport vehicle.

Figure 1:
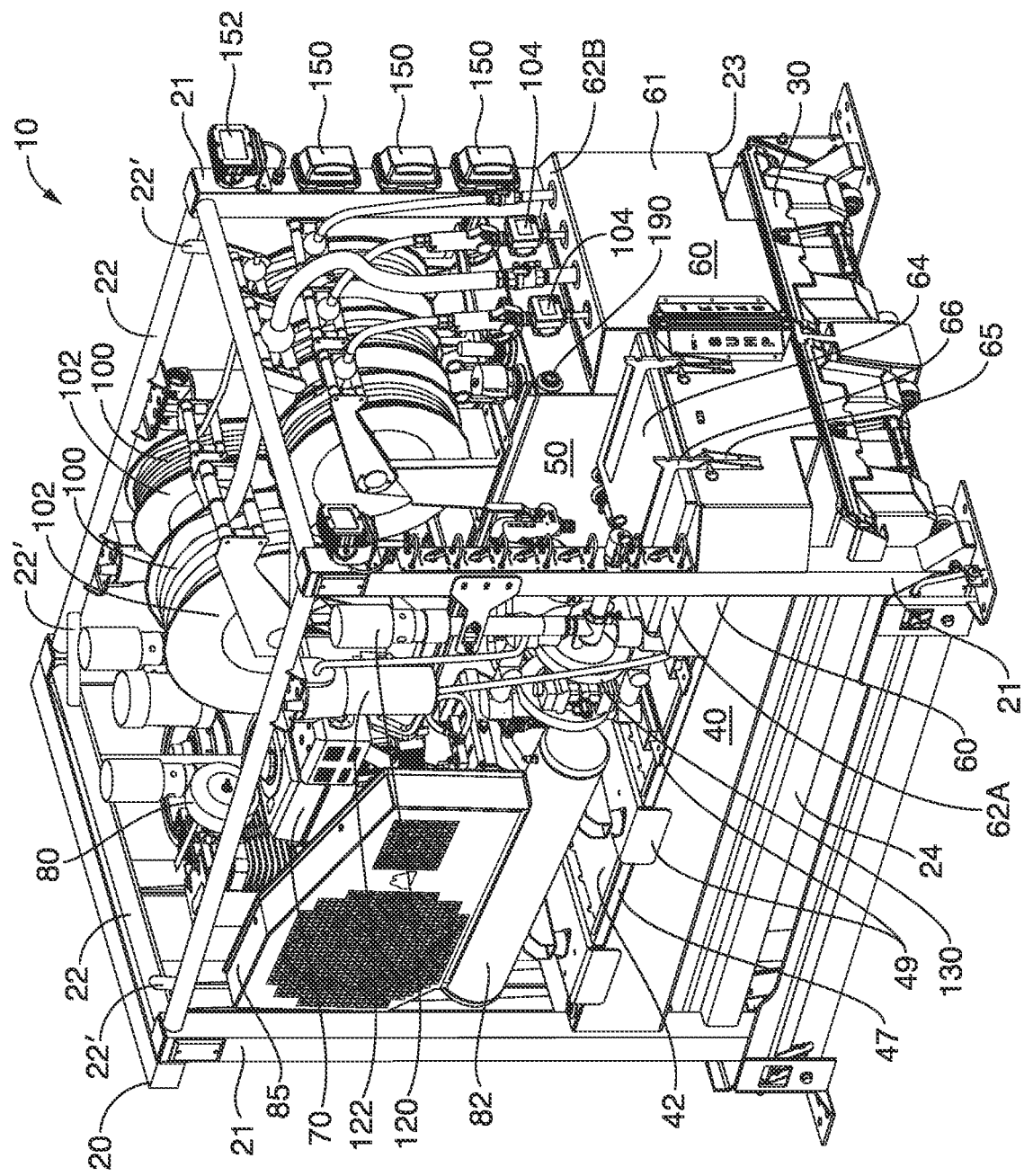
FIG. 1 is a perspective of one embodiment of a lube skid in accordance with the disclosed technology depicting tanks, service equipment and drawers.

FIG. 1 illustrates one embodiment of a new lube skid 10. The service components of skid lube 10 are undergirded by a substantially rigid carrying scaffold 20. Scaffold 20 may comprise one or more vertical scaffold members 21 and one or more lateral scaffold members 22. Members 21 and members 22 are connected to each other. The rigidity of the carrying/supporting function of scaffold 20 may be augmented by fixing one or more vertical members 21 of scaffold 20 to a portion of a first tank 40, to a portion of a second tank 50 and/or to a portion of a sump 60 which are positioned adjacent scaffold members 21 and/or 22. In this way, scaffold 20 carries first tank 40 and second tank 50.

Scaffold 20 may also comprise a multi-point lift system including lift bars 22'. In one embodiment, lift bars 22' are attached to lateral members 22 as shown in FIGS. 1, 6, 7 and 9. Lift bars 22' may be attached to members 22 by coping such that lift bar 22' protrudes within or into member 22 and lift bar 22' is welded into place at the juncture of bar 22' with member 22. A plurality of lift bars 22' may be engaged by a lifting device such as a crane to lift and move skid 10 as needed.

As shown in FIGS. 1-4, 8 and 10, scaffold 20 may comprise a carrying manifold 23. Manifold 23 may be affixed to one or more vertical scaffold members 21 or may be supported by an independent support mechanism, not shown. Manifold 23 provides a number of carrying and other functions. Manifold 23 may define one or more substantially lateral channels 24. Channel 24 is configured to carry components of a storage drawer 30 such as rollers 32 disposed on drawer 30 to facilitate lateral movement of drawer 30 in and out along channel 24.

Manifold 23 may further comprise one or more sloped members 25. Sloped member 25 may carry an overlying tank, such as tank 40 discussed below. The angle of sloped member 25 is configured to substantially correspond to a sloped bottom wall 45 of tank 40. Manifold 23 may further define one or more pockets 26 configured to receive a fork of a forklift for lifting and moving skid 10. The portion of manifold 23 defining the upper horizontal portion 26' of pocket 26 may also carries tank 40.

Figure 2:
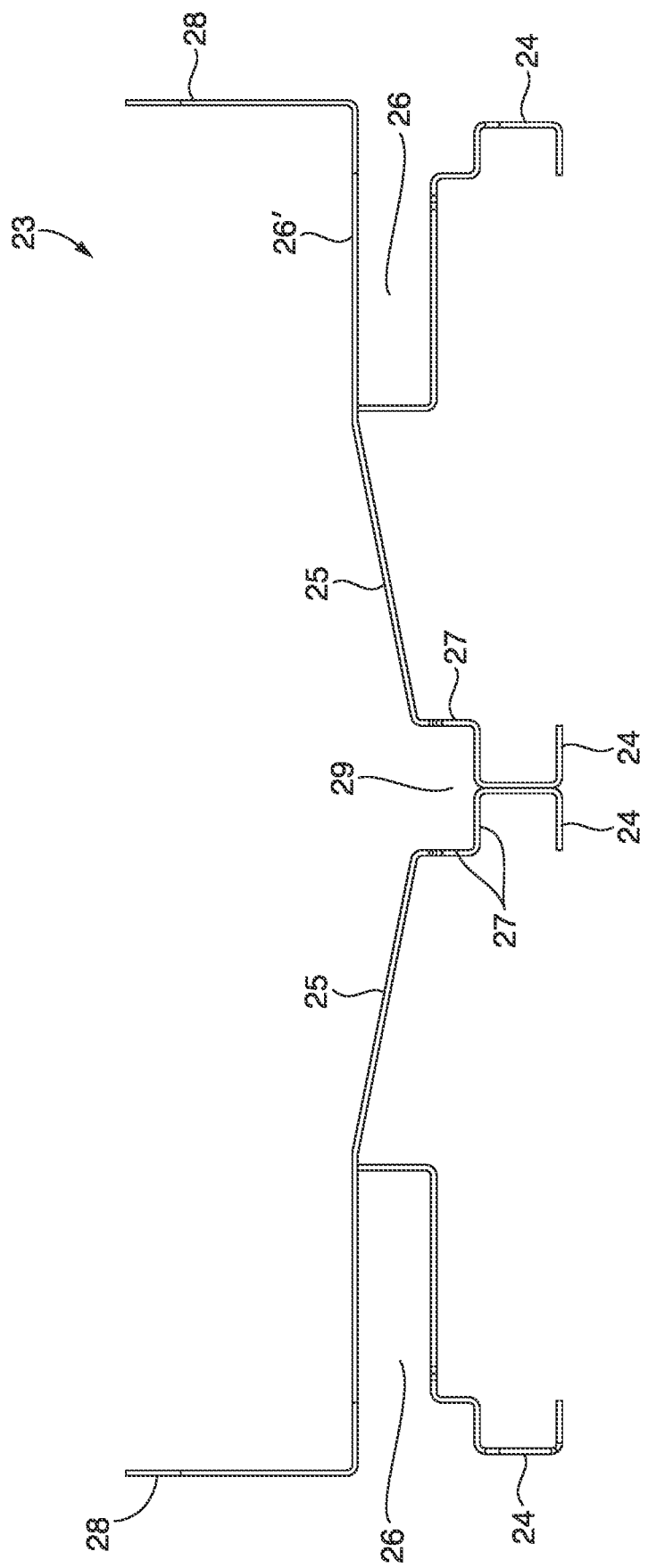
FIG. 2 is a cross-sectional view of carrying manifold 23 of FIG. 1.

Manifold members 27 may also define a trough cavity 29, see FIG. 2. Upwardly extending manifold members 28 define lateral supports for tank 40. For example, in one embodiment tank 40 and/or tank 50 may further comprise sides walls to which upwardly extending manifold members 28 may be connected for attachment. In the alternative, the position occupied by tank 40 could be shared and occupied by two tanks side-by side.

Manifold 23 may be constructed by joining a number of shaped portions together. In the alternative, manifold 23 may be formed by an extrusion process. Scaffold 20 may be constructed of aluminum, steel, or other metal or composite materials, or a combination of aluminum, steel, other metal and/or composite materials depending on the desired weight of lube skid 10 and/or on the carrying strength required of components of scaffold 20.

Figure 3:
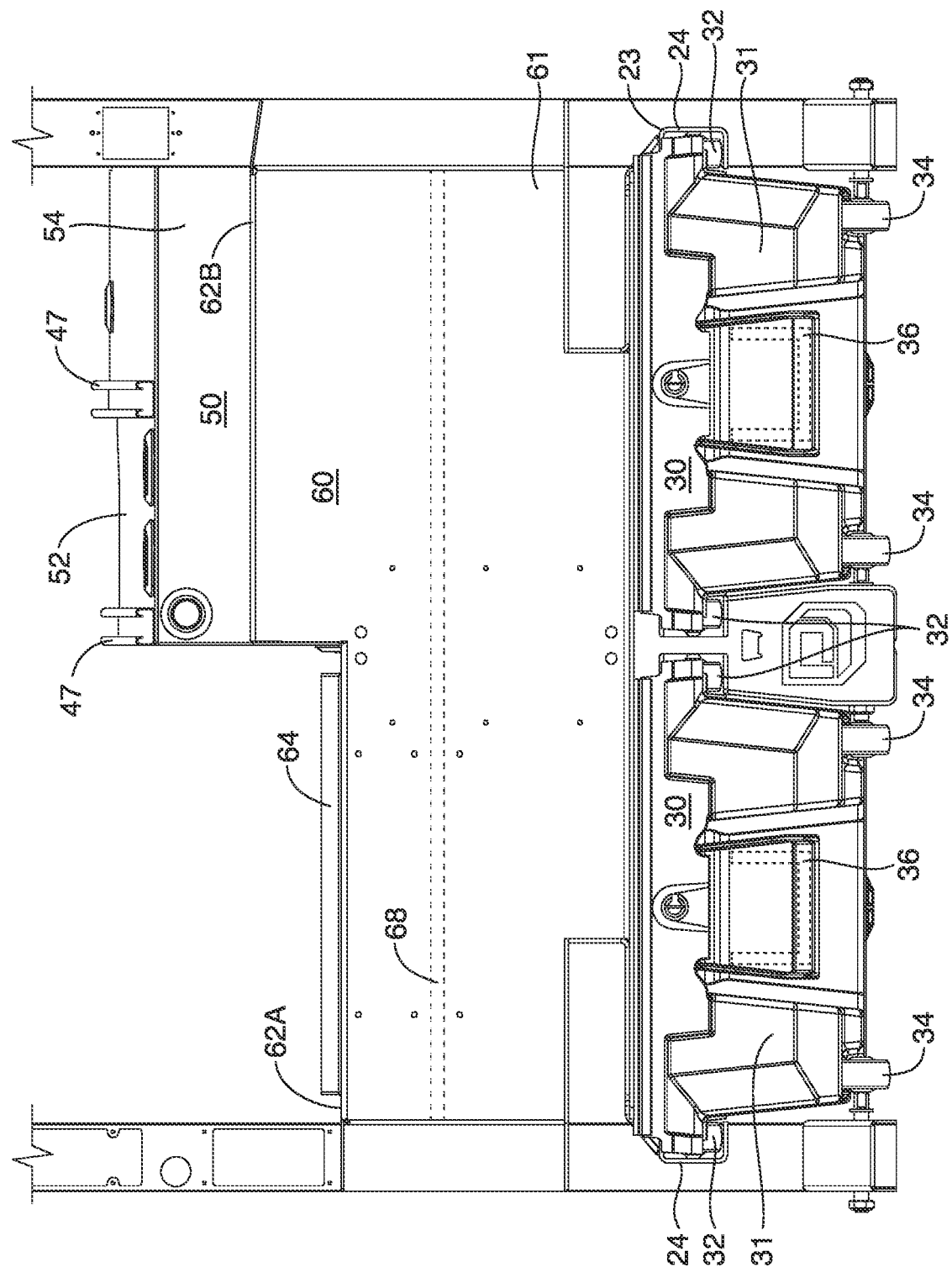
FIG. 3 is a front view of one embodiment of the lube skid depicted in FIG. 1 without the service equipment.
Figure 4:
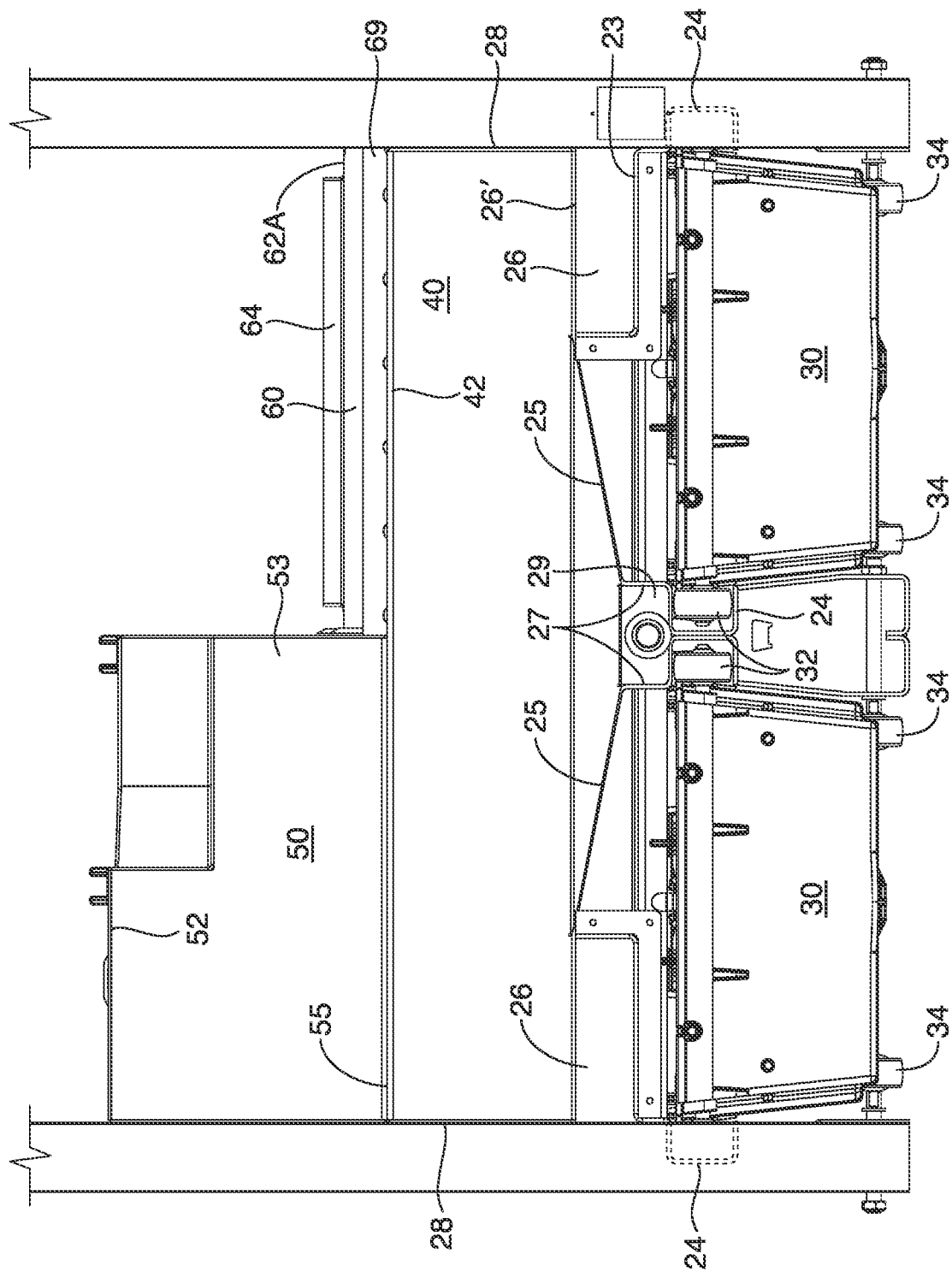
FIG. 4 is a rear view of one embodiment of the lube skid depicted in FIG. 1 without the service 5 equipment.

As shown in FIGS. 3 and 4, lube skid 10 may further comprise one or more service storage drawers 30. FIG. 3 is a front view of skid 10. FIG. 4 is a rear view of skid 10. Drawers 30 are configured to permit an operator to conveniently store desired or needed supplies, equipment, protective apparel and/or personal items. Drawer 30 comprises a receptable body 31. Body 31 may be constructed of any suitable material. Drawer 30 may also comprise upper rollers 32 and, if necessary, lower rollers 34 to facilitate the lateral movement of drawer 30. Roller 32 may be positioned in channel 24 of manifold 23 to carry drawer 30. In this way, scaffold 20 carries drawer 30. Drawer 30 may further comprise handle 36. Handle 36 may be a fixed, stationary push-pull handle or may be hingedly attached to drawer 30 with a portion of handle 36 being attached to drawer 30 and allowing a portion of handle 36 to swing away from drawer 30. To prevent unwanted outward movement of drawer 30 during storage, use or transport, drawer 30 may further comprise a suitable latch and/or locking mechanism to retain drawer 30 in a secure, closed position. In one embodiment, one or more service drawers 30 are disposed under first tank 40.

As shown in the Figures, lube skid 10 may further comprise one or more containers and/or tanks. Skid 10 may comprise first tank 40. Tank 40, or multiple tanks, may serve as a waste receptable to receive fouled, used and/or waste fluid evacuated from the vehicle or equipment serviced using skid 10 or from sump 60.

Figure 5A:
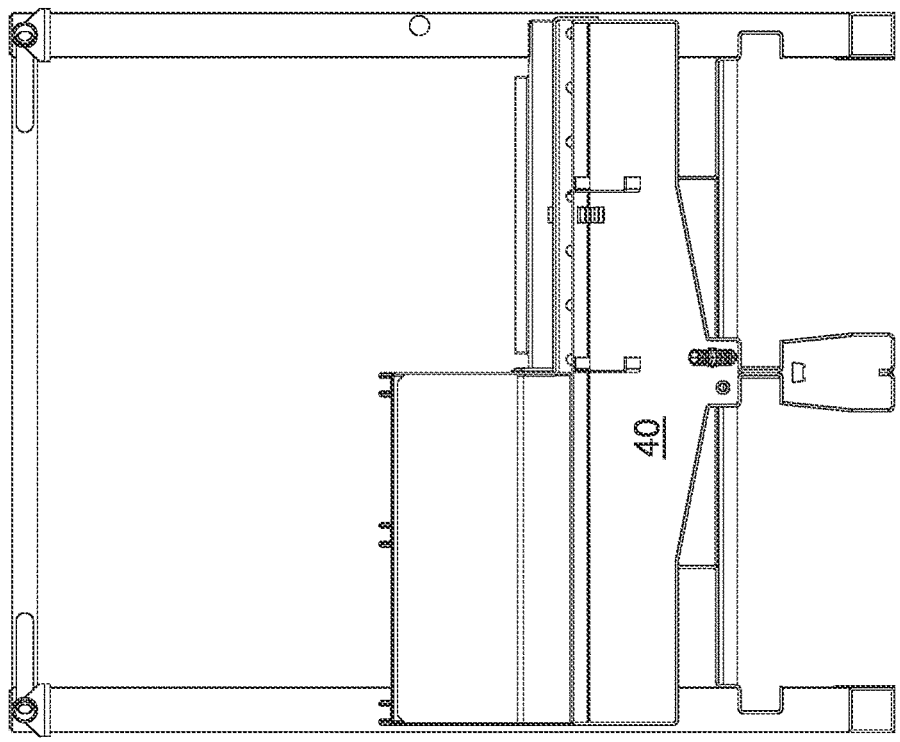
FIG. 5A is a cross-section along line A-A of FIG. 5

As illustrated in FIG. 4, in one embodiment tank 40 is positioned above manifold 23, or its equivalent, so that tank 40 is carried by manifold 23. Thus, the bottom wall of tank 40 may be configured to substantially correspond with the underlying portion of manifold 23. In this way the weight of tank 40 is distributed over scaffold 20. For example, tank 40 may comprise a sloping bottom wall portion corresponding to manifold member 25. Further, bottom wall of tank 40 may also conform to manifold members 27 to create a corresponding trough 29, see FIGS. 4 and 5A, within tank 40. Trough 29 within tank 40 defines a lowest area within tank 40. Sloped bottom walls of tank 40 serve to assist gravity to accumulate any remaining waste fluid in tank 40 to trough 29 within tank 40. Drainage or suction hardware (not shown) may be used to remove waste fluids from tank 40. Drainage hardware may be placed within tank 40 and attached at or near the lowest portion of tank 40 in trough 29. Drainage hardware may be attached on a rear wall 43 of tank 40. In this way, upon draining waste fluid from tank 40 the amount of residual waste fluid left in tank 40 is minimized.

If desired, tank 40 could be partitioned into two receptacles for receiving different waste fluid. The location of a partition in tank 40 could be selected to configure at least a portion of each partitioned receptacle to include a similarly functioning trough. Separate drainage hardware for each of the partitioned receptacles could be installed in in the lowest areas of each receptacle to drain waste fluid from each partitioned receptacle. Or, separate drainage hardware for each partitioned receptacle may be attached on rear wall 43 of tank 40 the corresponding trough. In this way, upon draining waste fluid from each partitioned receptacle the amount of residual waste fluid left in either receptacle is minimized.

Figure 5:
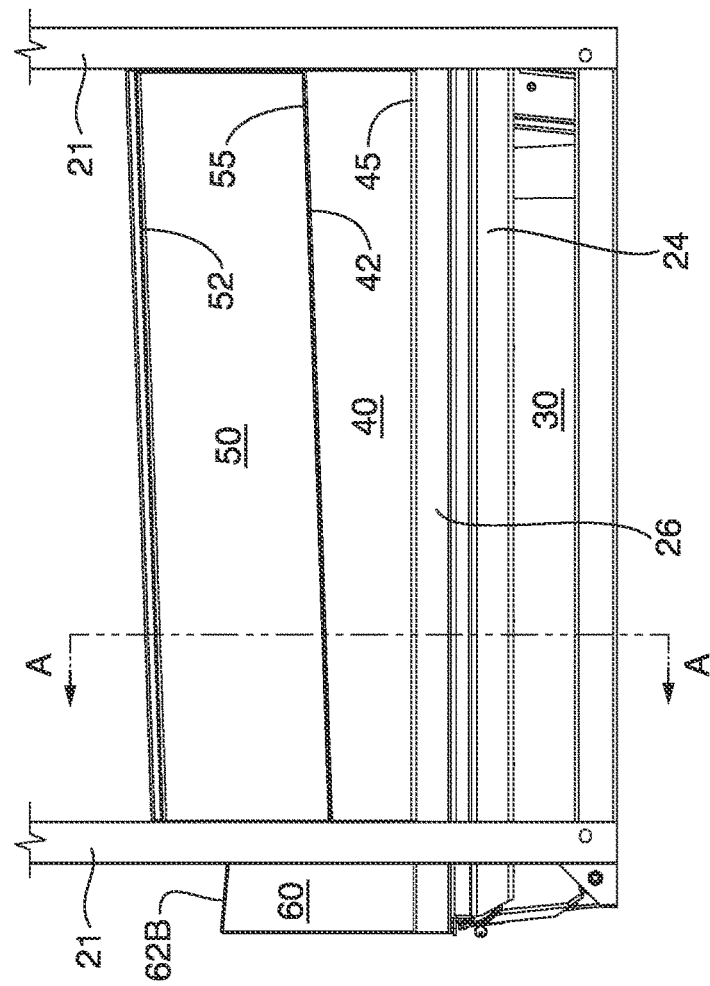
FIG. 5 is a schematic right-side view of one embodiment of the lube skid depicted in FIG. 1 without the service equipment.
Figure 10:
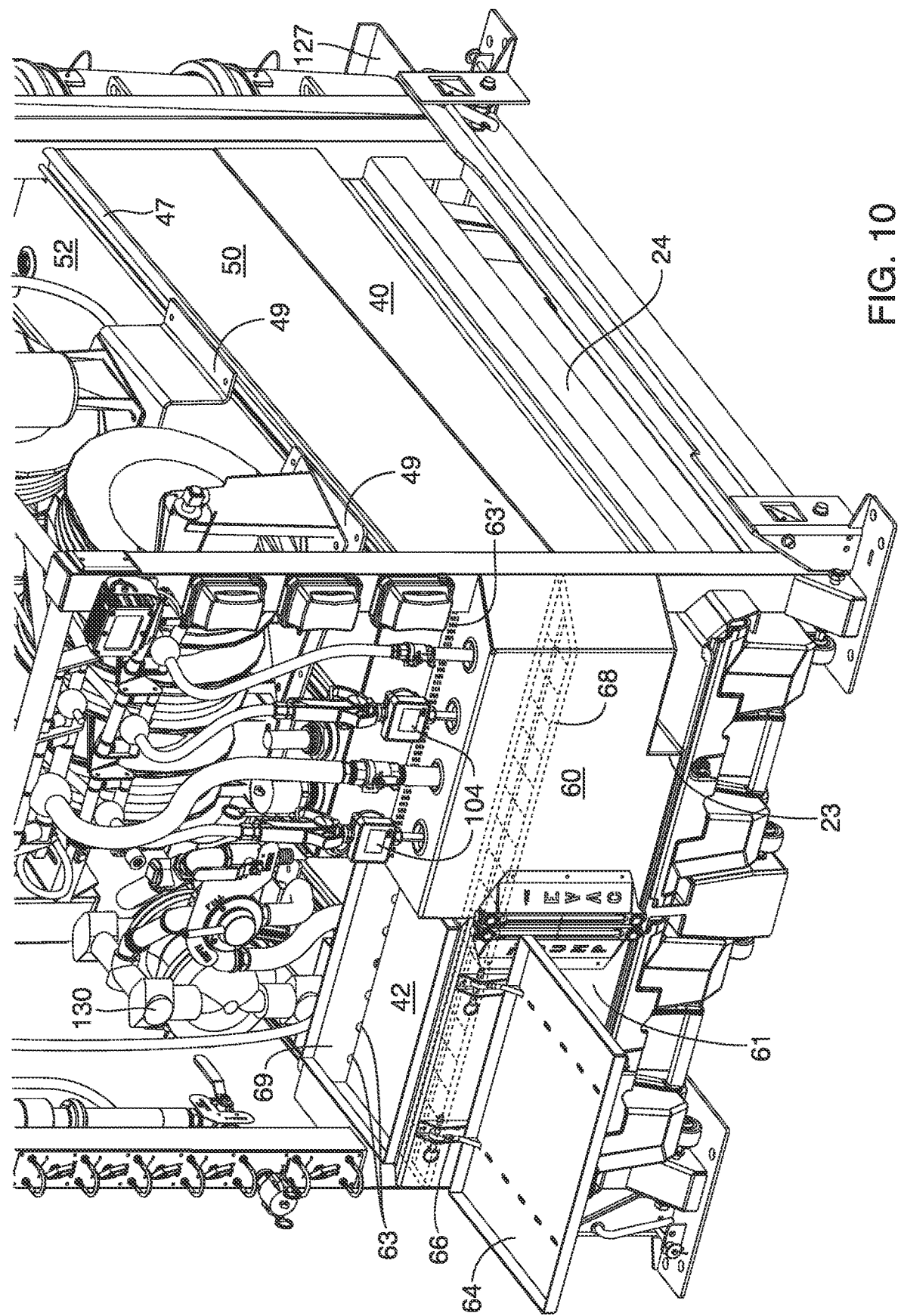
FIG. 10 is another partial front view of one embodiment of a lube skid in accordance with the disclosed technology with the sump lid open.

As illustrated FIG. 5, in one embodiment tank 40 may comprise a sloping top wall 42. Top wall 42 may serve as a spill containment surface. As illustrated in FIG. 1, a portion of top wall 42 may lay exposed and below service equipment. Top wall 42 may be sloped downward toward sump 60. In this configuration, any spills of fluids which land on top wall 42 are urged by gravity to flow toward sump 60. As shown in FIG. 10, at the juncture of top wall 42 of tank 40 and sump 60, a rear wall portion 69 of sump 60 defines one or more perforations 63 in sump wall 69 allowing flow of any spill along top wall 42 and into sump 60.

Figure 9:
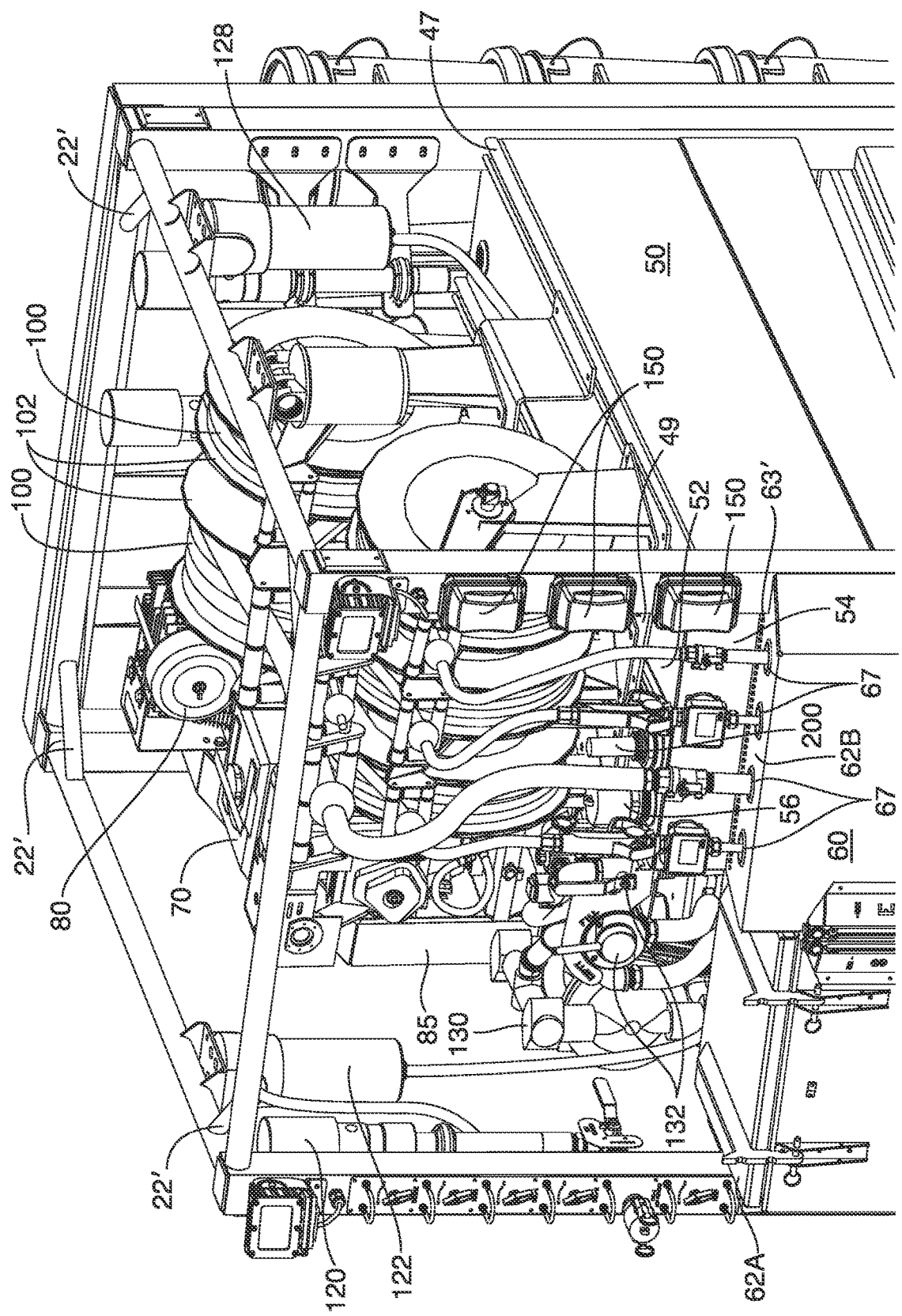
FIG. 9 is another partial front view of one embodiment of a lube skid in accordance with the disclosed technology.

As shown in the Figures, lube skid 10 may comprise second tank 50. Tank 50 may serve as a reservoir of new fluid product such as motor or engine oil needed for the service functions of skid 10. As illustrated in FIGS. 4 and 5, in one embodiment product tank 50 is positioned above tank 40 in a stacked arrangement. Tank 50 may be carried by tank 40, or in alternative, tank 50 may be carried by additional scaffold support members under tank 50 (not shown). Tank 50 may comprise a top wall 52, a bottom wall 55 and a rear wall 53. Bottom wall 55 may comprise a sloped wall substantially corresponding with top wall 42 of tank 40. Sloped bottom wall 55 serves a number of functions. Bottom wall 55 may be sloped downward in the direction of sump 60 (toward the front of the skid). This sloped configuration of bottom wall 55 defines a lowest area within tank 50 to which product accumulates under gravity and from which product may be pumped and/or from which product may be drained from tank 50. Drainage hardware (not shown) may be used to remove product from tank 50. Drainage hardware may be attached at or near the lowest portion of tank 50. For example, drainage hardware may be attached on a rear wall 53 of tank 50. This kind of sloped configuration of bottom wall 55 minimizes the amount of residual product left in tank 50 after pumping or draining. Sloped bottom wall 55 also accommodates stacking of tank 40 on tank 50 and provides a substantially even distribution of the weight of tank 50 upon tank 40 and scaffold 20. As shown in FIG. 5, top wall 52 of tank 50 may also be sloped creating a rhombus cross-section of tank 50. As shown in FIG. 9 and other Figures, tank 50 may further comprise a fill port 56 through which product may be pumped or poured into tank 50.

Figure 6:
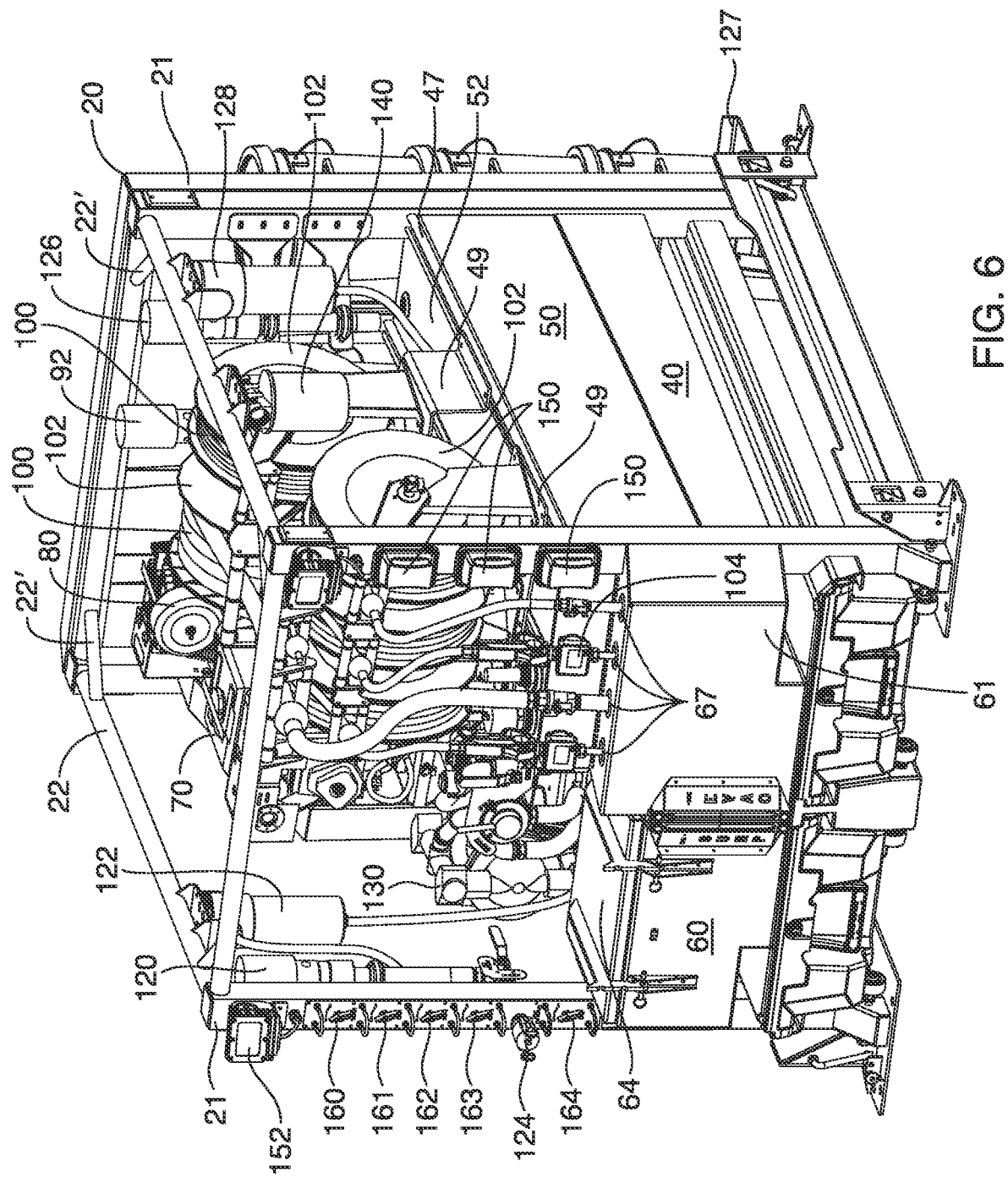
FIG. 6 is another perspective of one embodiment of a lube skid depicted in accordance with the disclosed technology depicting tanks, service equipment and drawers.

As illustrated in FIGS. 4 and 5, in one embodiment tank 50 may comprise a sloping top wall 52. As illustrated in FIG. 6, a portion of top wall 52 may lay exposed and below service equipment. As illustrated in FIG. 5, top wall 52 may serve as a spill containment surface. Top wall 52 may be sloped downward toward sump 60. In this configuration, any spills of fluids which land on top wall 52 are urged to flow by gravity toward sump 60. As shown in FIG. 9, at the juncture of front wall 54 of tank 50 and sump 60, a top wall 62B of sump 60 defines one or more perforations 63' along top wall 62B allowing flow of any spill along top wall 52 and into sump 60. To further contain fluid spilling onto top wall 62B, top wall 62B may be inclined rearwardly such that top wall 62B comprises a vertically lower portion at or near the juncture between top wall 62B and front tank wall 54 further urging spills into perforations 63'.

A raised edge or bead along rear and side peripheries of top wall 42 and top wall 52 (not shown), as needed, may serve to contain any spills onto top wall 42 or top wall 52 from running off the sides of tank 40 and tank 50. In the alternative, a mounting bar 47 may be attached to top wall 42 and/or 52. Bar 47 acts to contain the flow of spills to direct any spill toward sump 60. To assist in fixing mounting bar 47 in place, top wall 42 and/or top wall 52 may also comprise an intervening plate of suitable material which plate may be affixed on the upper surface of top wall 42 and/or top wall 52. When an intervening plate is used, the intervening plate serves the same function as the top wall onto which it is affixed.

As shown in Figures, skid 10 may further comprise a sump 60. Sump 60 is positioned forward of tank 40 and tank 50. Sump 60 may comprise a front wall 61, rear wall portion 69 and top wall 62. In one embodiment, sump 60 is positioned adjacent a side wall of first tank 40 and/or second tank 60. Top wall 62 may comprise top wall 62A and 62B. Sump 60 may define an opening. In one embodiment the opening is in top wall 62A. Sump 60 may also comprise a removeable sump lid 64 which covers the opening in top wall 62A of sump 60. Sump lid 64 may be hingedly attached to top wall 62A using a hinge assembly 65 comprising hinge legs 66. As shown in FIG. 10, when sump lid 64 is open, hinge legs 66 support lid 64 against sump 60 and the interior of sump 60 is accessible. Sump 60 may also comprise a permeable screen or shelf 68 shown with phantom lines in FIGS. 3 and 10. When sump lid 64 is removed or open, product filters or other product- or waste-laden objects may be placed on screen 68 in sump 60 to allow excess product or waste to drip into sump 60 for capture.

In one embodiment relative to tank 40, a portion of sump 60 may also overlap above tank 40. With an overlap of tank 40 by sump 60 as shown in the Figures, the size of the opening in top wall 62A and sump lid 64 may be selected to accommodate the size of the anticipated filters and objects to be drained into sump 60.

Sump top wall 62B may also define one or more sump access portals 67. Portal 67 is configured to receive a service end of a product or evacuation hose to allow any excess product or waste to drip into sump 60. For example, a metered service end 104 of hose 100 may be disposed in portal 67. Either the shape of portal 67 relative to the end of a hose 100 or the distance between screen 68 and portal 67 will define how far the service end 104 of a hose 100 inserts into sump 60. Portals 67 may serve as the stationary, non-use repository of the ends of hoses.

Sump top wall 62 may comprise a multi-level top configuration 62A and 62B as shown in the Figures. Disposing sump top wall 62A with sump lid 64 vertically lower offers an ergonomic advantage for the service operator by bringing access to the interior of sump 60 closer to an operator standing on the ground when the operator is draining devices on screen 68. A similar advantage is also provided when sump lid 64 is open because hinge 65 further lowers sump lid 64 for use as a service tray at a lower vertical height convenient for the operator as shown in FIG. 10.

As shown in the Figures, it is contemplated that a plurality of service components or devices are carried by skid 10. As needed, one or more mounting bars 47 may be attached to the upper surface of a tank. Mounting bar 47 may be attached by any suitable means recognized by those of skill in the art. For example, mounting bar 47 may be welded to a tank, or to an intervening plate as discussed above. Mounting bar 47 receives other load-bearing rails or plates 49 which span at least a portion of the top of a tank and to which service devices may be attached. The spanning nature of rails or plates 49 permit any spills onto the tank to flow along the top of the tank toward sump 60.

As shown in FIGS. 1 and 6, skid 10 may comprise a motor 70. Motor 70 may comprise a gasoline or diesel combustion engine or an electric motor. Motor 70 is used to power other service devices.

Skid 10 may also comprise an air compressor 80. Air compressor 80 may be coupled to one or more compressed air tanks 82. Motor 70 may provide the driving force needed to operate air compressor 80. Skid 10 may further comprise a cooling unit 85 to cool motor 70 and compressor 80, as needed or desired.

It is also contemplated that skid 10 may comprise an electrical power unit (not shown). Electrical power from an external source may, if necessary to invert voltage, pass through the power unit before the electrical power is made available to services devices, outlets or other power tools or equipment. In the alternative, an electric power generator (not shown) may be a component of motor 70 or compressor 80.

Figure 7:
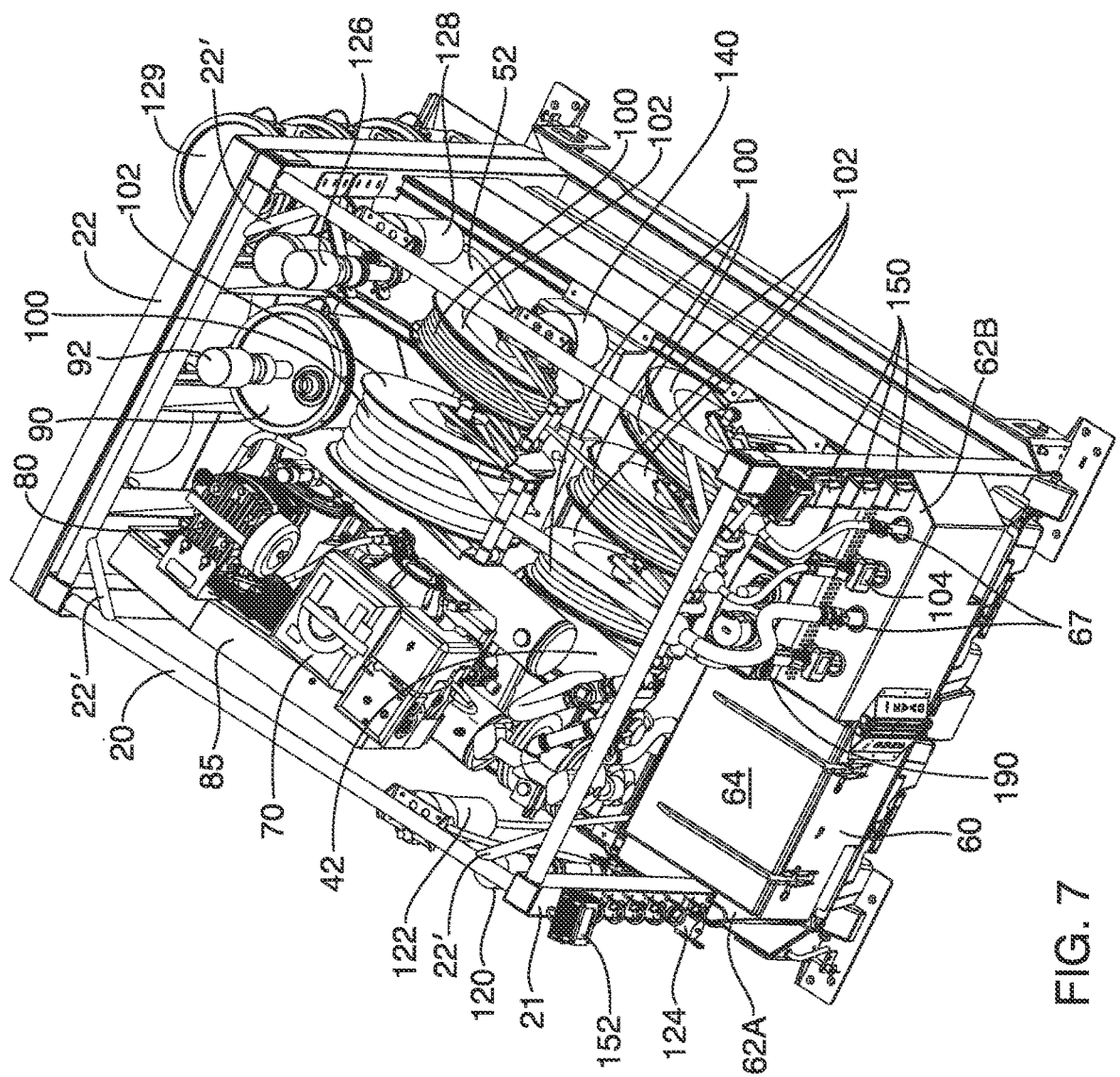
FIG. 7 is a top perspective of one embodiment of a lube skid in accordance with the disclosed technology depicting tanks, service equipment and drawers.

As shown in FIG. 7, skid 10 may also comprise a grease barrel 90 and a corresponding grease pump 92. Grease pump 92 is also coupled with a selected hose 100 about a hose reel 102 for dispensing.

Skid 10 may also comprise one or more new product pumps. As illustrated in FIGS. 1, 6 and 7 skid 10 may comprise a primary product pump 120 with an associated filter 122 coupled to product tank 50 or to an external product supply through suction coupling 124 on vertical support 21. Product pump 120 is coupled with a selected hose 100 about a hose reel 102 for dispensing. Skid 10 may also comprise a secondary product pump 126 with an associated filter 128. Product pump 126 may draw product from one or more auxiliary product supply barrels 129. Product pump 126 is coupled with a selected hose 100 about a hose reel 102 for dispensing. It contemplated that skid 10 may further comprise a self-supporting shelf system 127 which may be attached to the rear of skid 10 to hold up to twelve 5-gallon barrels 129 of product.

Skid 10 may also comprise an evacuation pump 130 as illustrated in the Figures. Pump 130 may be a bi-directional pump to meet the pumping and/or suction needs of the operator when using skid 10. Evacuation pump 130 is coupled to its corresponding valves 132. Valves 132 are coupled with a hose 100 about a hose reel 102 and/or to sump 60. Valves 132 permit the operator to place pump 130 in the desired fluid communication. For example, pump 130 may be used to fill waste tank 40 with waste or other fluids from the vehicle or equipment being serviced through an associated hose 100. Pump 130 may be used to fill waste tank 40 with waste from sump 60 through a fluid coupling between valves 132 and sump 60. Pump 130 may also be used to empty waste from waste tank 40.

Skid 10 may further comprise one or more filters 122, 128 and 140 for filtering of product as desired. Filter 122 is associated with primary product pump 120. Filter 128 is associated with secondary product pump 126. Filter 140 may be coupled to product tank 50 and may service as a filter for product being input into product tank 50 from an external product supply. When servicing or replacing filters 122, 128, 140 or other devices laden with product or waste, they may be placed on screen 68 for draining into sump 60.

Skid 10 may further comprise one or more controls 150. Controls 150 may be integrated into or mounted to a vertical support member 21 as shown in FIG. 1 and other Figures. Control 150 may comprise a weather-proof cover. Control 150 may be configured to control electric heaters disposed within tanks 40 and 50 (not shown), to control for one or more electric flood lights 152 and/or to provide an electrical outlet into which an electrical device or tool may be plugged to receive operational power.

Electrical power for tank heaters may comprise power from the transport vehicle's electrical system. In one embodiment, the electrical power needed for tank heaters is provided from the transport vehicle while the transport vehicle is traveling to the service site. In this way, the tank heater may be powered from the alternator of the transport vehicle and may require a power inverter to change voltage from the 12V typically provided by a vehicle alternator to the voltage required to power the tank heater(s). In one embodiment, operational power for an electrical outlet may comprise pass-through power from an external power source coupled to skid 10 or power from a generator component associated with motor 70 or compressor 80.

As shown in FIG. 6 and other Figures, skid 10 may also comprise a plurality of pump control switches. In one embodiment, grease pump 92, primary product pump 120, secondary product pump 126 and evacuation pump 130 may be configured to be driven by compressed air. Each pump may be independently controlled with a switch. For example, switch 160 may control air to grease pump 92. Switch 161 may control air to evacuation pump 130. Switch 162 may control air to primary product pump 120. Switch 163 may control air to secondary product pump 126. Further switches may be configured for other air control purposes. For example, switch 164 may control the release or dump of air from tanks 82 as desired or needed. In one embodiment, switches 160-164 may comprise proportional switches or switches which provide proportional or partially proportional control of gate valves controlling the amount of compressed air that reaches each pump.

Figure 8:
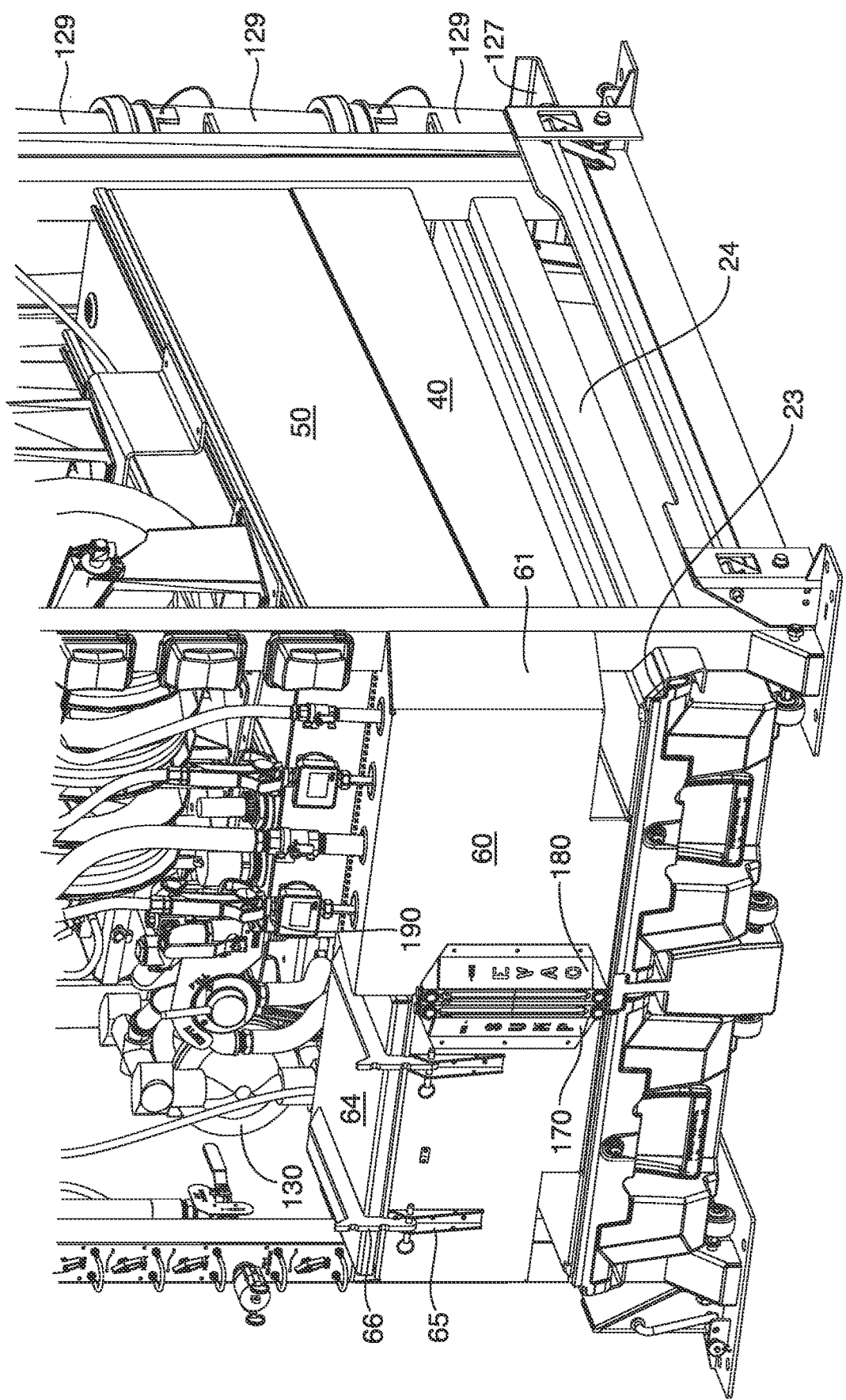
FIG. 8 is partial front view of one embodiment of a lube skid in accordance with the disclosed technology.

As shown in FIGS. 8 and 9 and other Figures, skid 10 may further comprise one or more fluid level indicators. For example, a fluid level indicator 170 may be in fluid communication with sump 60 to indicate the level of fluid in sump 60. Fluid level indicator 180 may be in fluid communication with waste tank 40 to indicate the level of fluid in waste or evacuation tank 40. Fluid level indicator 190 may be a visual fluid level indicator of product in product tank 50. Fluid level indicator 200 may be a mechanical device registering the level of product in product tank 50.

The disclosed technology may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A lube skid comprising:
   one or more lube service components;
   a laterally sloped spill containment surface disposed beneath the one or more lube service components; and
   a sump disposed at the base of and laterally adjacent the sloped spill containment surface,
   wherein the laterally sloped spill containment surface is sloped downward toward the sump.

2. The lube skid of claim 1 wherein the laterally sloped spill containment surface comprises a top surface of a tank.

3. The lube skid of claim 1 further comprising one or more service storage drawers.

4. The lube skid of claim 1 further comprising a scaffold.

5. The lube skid of claim 2 further comprising a scaffold to carry the tank.

6. The lube skid of claim 5 wherein the tank comprises side walls and a bottom wall and the scaffold is connected to a portion of a side wall or bottom wall.

7. The lube skid of claim 4 wherein the scaffold defines one or more pockets to receive a fork of a forklift.

8. The lube skid of claim 4 wherein the scaffold carries the one or more service storage drawers.

9. The lube skid of claim 4 wherein the scaffold carries the one or more lube services components.

10. The lube skid of claim 1 wherein the laterally sloped spill containment surface comprises a raised edge along one or more peripheries of the laterally sloped spill containment surface.

11. A lube skid comprising:
    a laterally sloped spill containment surface;
    a sump disposed at the base of and laterally adjacent the sloped spill containment surface; and
    one or more service storage drawers.

12. The lube skid of claim 11 further comprising one or more lube service components.

13. The lube skid of claim 11 wherein one or more lube service components are disposed above the sloped spill containment surface.

14. The lube skid of claim 11 wherein the laterally sloped spill containment surface comprises a sloped top wall of a tank.

15. The lube skid of claim 11 wherein the laterally sloped spill containment surface is sloped downward toward the sump.

16. The lube skid of claim 14 wherein the sloped top wall of the tank is sloped downward toward the sump.

17. The lube skid of claim 14 wherein the one or more service storage drawers are disposed below the tank.

18. The lube skid of claim 11 further comprising a scaffold.

19. The lube skid of claim 18 wherein the scaffold carries the tank.

20. The lube skid of claim 18 wherein the scaffold defines channels to carry the one or more service storage drawers.

* * * * *